United States Patent

Moore et al.

(10) Patent No.: US 10,860,842 B1
(45) Date of Patent: Dec. 8, 2020

(54) POSITIONAL TRACKING USING MULTIPLE BASE STATIONS

(71) Applicant: Facebook Technologies, LLC, Menlo Park, CA (US)

(72) Inventors: David Maurice Moore, Redmond, WA (US); Evan Paul Gander, Seattle, WA (US); Jason Victor Tsai, Bellevue, WA (US); Zhaoming Zhu, Redmond, WA (US); Richard Andrew Newcombe, Seattle, WA (US); Renzo De Nardi, Seattle, WA (US); Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 434 days.

(21) Appl. No.: 15/853,627

(22) Filed: Dec. 22, 2017

Related U.S. Application Data

(60) Provisional application No. 62/609,290, filed on Dec. 21, 2017.

(51) Int. Cl.
*G01D 5/40* (2006.01)
*G01C 3/08* (2006.01)
*G06K 9/00* (2006.01)

(52) U.S. Cl.
CPC ........... *G06K 9/00335* (2013.01); *G01C 3/08* (2013.01); *G01D 5/40* (2013.01); *G06K 9/00362* (2013.01)

(58) Field of Classification Search
CPC .. G06K 9/00335; G06K 9/00362; G01D 5/40; G01C 3/08

USPC ......................................................... 356/4.01
See application file for complete search history.

(56) References Cited

U.S. PATENT DOCUMENTS

| | | | |
|---|---|---|---|
| 5,235,183 | A | 8/1993 | Whiting et al. |
| 5,552,893 | A | 9/1996 | Akasu |
| 5,831,717 | A | 11/1998 | Ikebuchi |
| 6,856,919 | B1 | 2/2005 | Bastian et al. |
| 7,787,134 | B2 | 8/2010 | Kohnen et al. |
| 9,958,960 | B2 | 5/2018 | Krah |
| 2003/0202259 | A1 | 10/2003 | Nishimae et al. |
| 2005/0110951 | A1 | 5/2005 | Yancey et al. |
| 2006/0012777 | A1 | 1/2006 | Talbot et al. |
| 2010/0020935 | A1 | 1/2010 | Dafni |
| 2012/0212727 | A1 | 8/2012 | Hammes |
| 2013/0103017 | A1 | 4/2013 | Weckwerth et al. |
| 2015/0029583 | A1 | 1/2015 | Hein |
| 2016/0076740 | A1 | 3/2016 | Watanabe |
| 2016/0266283 | A1 | 9/2016 | Segawa |

(Continued)

*Primary Examiner* — Daniel L Murphy
(74) *Attorney, Agent, or Firm* — Fenwick & West LLP

(57) ABSTRACT

A system includes at least two base stations that emit light beams to illuminate an area for positional tracking objects in the area. A base station emits at least two light beams that rotate around a rotation axis at a rotational speed unique to the base station. Responsive to being illuminated by the light beams emitted by the at least two base stations, an object being tracked generates illumination data. The system determines which illumination data corresponds to one of multiple base stations by analyzing the illumination data over time. The system analyzes the illumination data corresponding to one base station to determine an orientation and/or position of the object relative to that base station.

23 Claims, 9 Drawing Sheets

(56) References Cited

U.S. PATENT DOCUMENTS

2017/0252859 A1 9/2017 Kumkar et al.
2018/0113199 A1* 4/2018 Choi .................. G01S 17/87

* cited by examiner

240

300

POSITIONAL TRACKING USING MULTIPLE BASE STATIONS

CROSS REFERENCE TO RELATED APPLICATIONS

This application claims the benefit of U.S. Provisional Application No. 62/609,290, filed Dec. 21, 2017, which is incorporated by reference in its entirety.

BACKGROUND

The present disclosure generally relates to positional tracking, and specifically relates to positional tracking using multiple base stations.

Positional tracking is crucial in virtual reality (VR), augmented reality (AR), and mixed reality (MR) systems because an accurate representation of physical objects such as hands and heads in a virtual world contribute towards achieving immersion and a greater sense of presence. Another reason is that positional tracking improves the 3D perception of a virtual environment if physical motion is accurately reflected in a virtual world.

Positional tracking allows a user's movement and gesture to be detected and tracked over time. As such, the user's viewpoint can possibly change according to the user's position, orientation, and motion. An exact representation of the user's hands and other objects is possible in a virtual environment. A user can touch and move a virtual object by hand gesture thereby to connect the physical and virtual worlds.

Inside-out tracking traces scene coordinates of moving objects such as head-mounted displays or motion controller peripherals in real time. An inside-out tracking process uses one or more cameras or other sensors that are placed on a tracked object. The tracked object can move freely around a designated area defined by the intersecting visual ranges of the base stations. However, systems that use inside-out tracking have limited field of view.

SUMMARY

In one embodiment, an illumination device includes an illumination source that generates one or more source light beams. The illumination device may be used as a part of a virtual reality (VR) system, an augmented reality (AR) system, a mixed reality (MR) system, or some combination thereof. The illumination device further includes an optical module positioned along a rotation axis. The optical module divides the one or more source light beams into a first light beam and a second light beam. The first light beam and the second light beam are separated from each other by a constant angle in a plane orthogonal to the rotation axis. The first light beam and the second light beam together illuminate a local area. The local area is illuminated by light beams emitted by a plurality of illumination devices including the illumination device. The first light beam and the second light beam rotate around the rotation axis at a first rotational speed that is unique to the illumination device among the plurality of illumination devices.

In one embodiment, a system includes a first base station, a second base station, and an object (e.g., a head-mounted display (HMD), an interface device such as a hand piece, controller, or accessory, and/or other types of devices/objects). The system can be a VR system, an AR system, a MR system, or some combination thereof. The first base station emits a first plurality of light beams rotating at a first rotational speed. The second base station emits a second plurality of light beams rotating at a second rotational speed. The object includes at least one detector to detect illumination by the first plurality of light beams and a second plurality of light beams over a period of time and to generate illumination data in response to the detected illumination.

In one embodiment, a device includes a processor and memory storing computer readable instructions configured to cause the processor to receive illumination data. The illumination data includes a first set of illumination data generated in response to illumination by a first plurality of light beams emitted by a first base station and a second set of illumination data generated in response to illumination by a second plurality of light beams emitted by a second base station from an object. The computer readable instructions are configured to cause the processor to identify the first set of illumination data and the second set of illumination data, to apply a first model to the first set of illumination data to determine a first orientation of the device in reference to the first base station, and to apply a second model to the second set of illumination data to determine a second orientation of the device in reference to the second base station. The first plurality of light beams rotate at a first rotational speed and the second plurality of light beams rotate at a second rotational speed that is different from the first rotational speed.

In one embodiment, a computer-implemented method receives illumination data. The illumination data includes a first set of illumination data generated in response to illumination by a first plurality of light beams emitted by a first base station and a second set of illumination data generated in response to illumination by a second plurality of light beams emitted by a second base station from an object. The computer-implemented method identifies the first set of illumination data and the second set of illumination data, applies a first model to the first set of illumination data to determine a first orientation of the device in reference to the first base station, and applies a second model to the second set of illumination data to determine a second orientation of the device in reference to the second base station. The first plurality of light beams rotate at a first rotational speed and the second plurality of light beams rotate at a second rotational speed that is different from the first rotational speed.

Figure 1:
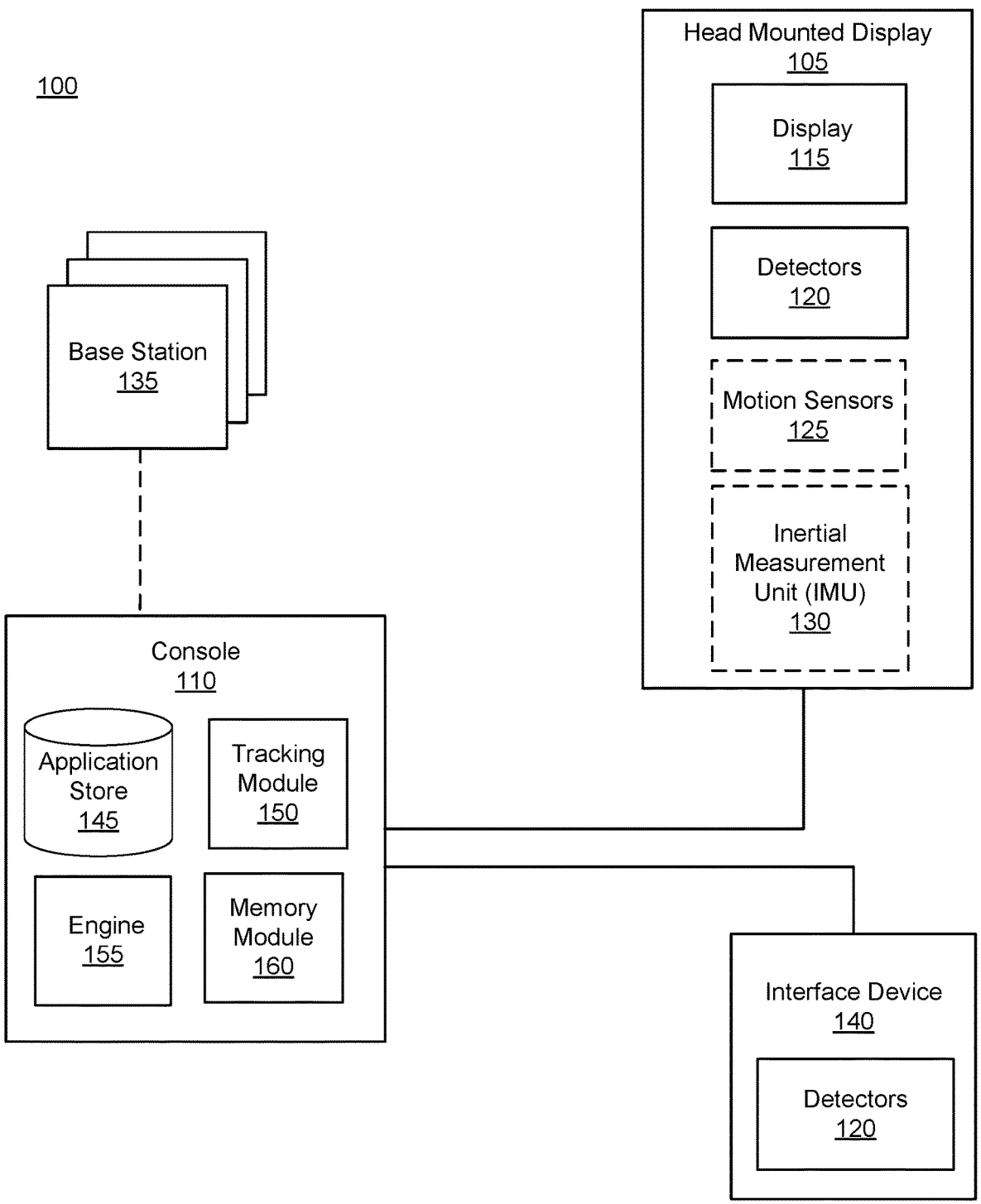
FIG. 1 is a block diagram of a system that uses asymmetric light beams for positional tracking, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In systems that use outside-in positional tracking, a reference point (e.g., 0 angle) is generally broadcasted to the tracking volume. The reference point is distributed with high (<1 microsecond) accuracy to the tracking volume to ensure accurate positional tracking. The reference point is typically broadcasted using omni-directional light that flashes periodically. However, this flashing light falls off in power more rapidly than the tracking beams and limits the range of an eye-safe system. In addition, it is expensive to use a second illumination system that emits the omni-directional light. When multiple base stations are used for positional tracking, to correctly determine an orientation and/or location of the tracking volume, it is important to track which light beam is transmitted by which base station.

Systems described herein use outside-in positional tracking. A base station emits at least two rotational light beams for positional tracking of one or more objects (e.g., a head-mounted display (HMD), an interface device such as a hand piece, controller, or accessory, and/or other types of devices/objects) in a local area. The rotational light beams are typically in an infrared (IR) band and rotate around a rotation axis at a first rotational speed $\omega_1$. The two rotational light beams are separated by a constant angle $\alpha$ in a plane that is orthogonal to the rotation axis. In various embodiments, the rotational speed $\omega_1$ is unique to a particular base station. That is, when multiple base stations are used for positional tracking the objects in a local area, the multiple base stations emit light beams rotating at different rotational speeds. A base station can be identified by the unique rotational speeds of its emitted light beams.

The two light beams together illuminate the local area. An object detects illumination and generates illumination data including at least temporal information of the illumination. In particular, the object includes multiple detectors distributed across its exterior surface to generate the illumination data. The illumination data can be analyzed in reference to the detectors' positions to determine the orientation of the object.

A system analyzes the illumination data to identify the illumination data generated in response to illumination by the light beams for positional tracking. For example, the system analyzes temporal information between the illumination data to distinguish illumination data corresponding to light beams emitted by different base stations. The system may identify the rotational speed at which the rotational beams rotate. Additionally, the system identifies the offset between a pair of light beams for positional tracking. The system analyzes the two series of illumination data in reference to the detector's positions to determine the orientation of the object relative to a base station.

System Overview

FIG. 1 is a block diagram of a system 100 that tracks position of one or more objects in a local area such as an HMD or an interface device using temporally and/or spatially asymmetrical light beams at rotational speeds that are unique to base stations emitting the asymmetrical light beams, according to an embodiment. The system 100 may be a virtual reality (VR) system, an augmented reality (AR) system, a mixed reality (MR) system, or some combination thereof. The system 100 shown by FIG. 1 comprises a HMD 105, a plurality of base stations 135, and an interface device 140 that are each communicatively coupled to the console 110. The plurality of base stations are collectively referred to herein as the base stations 135. An individual base station is also referred to herein as a base station 135. A particular base station is referred to as 135A, 135B, . . . 135N, etc. In some embodiments, a base station 135 is not coupled to the console 110. A base station 135 may be separate from and/or integrated with the console 110. In some embodiments, the console 110 may also act as an AR and/or MR console. In these embodiments, the console 110 provides computer-generated elements (e.g., images, videos, sound, etc.) that augment views of a physical, real-world environment. While FIG. 1 shows an example system 100 including one HMD 105, multiple base stations 135, and one interface device 140, in other embodiments any number of these components may be included in the system 100. For example, there may be multiple HMDs 105 each having an associated interface device 140 and detecting signals (e.g., light beams) emitted from the base stations 135; with each HMD 105, interface device 140, and/or base stations 135 communicating with the console 110. In alternative configurations, different and/or additional components may be included in the system 100. Furthermore, in alternative configurations, any one or combination of components for system 100 described herein may be combined within a given device (e.g., the HMD 105 includes the tracking module 150 and optionally the engine 155 such that the HMD 105 is configured to track its own movement, position, and/or orientation in the local area without or in addition to the console 110). Light beams are used as example signals emitted by base stations 135 and detected by the HMD 105 for positional tracking throughout the description herein. In some embodiments, the base stations 135 may be modified to emit non-optical signals such as acoustic signals, and microwave signals.

A base station 135 emits signals (e.g., light beams) for positional tracking of the one or more objects in the local area. The base station 135 emits at least two light beams that rotate around a rotation axis. The at least two light beams illuminate the local area. A position and/or orientation of an object (e.g., the HMD 105, the interface device 140) located in the local area affects how the at least two light beams illuminate the object. Accordingly, the object's position and/or orientation can be determined by analyzing illumination of the object by the at least two light beams. The base station 135 emits two light beams that rotate around the rotation axis at the same rotational speed $\omega_1$ (e.g., 60 Hz, 120 Hz). The rotational speed $\omega_1$ is unique to the base station 135. That is, the rotational speed $\omega_1$ of the light beams emitted by a base station 135A is different from the rotational speed of the light beams emitted by another base station 135B. Apostrophes are used to differentiate the same parameters of different base stations, such as rotational speeds of light beams emitted, offset angles, etc. The base station 135 can select the rotational speed $\omega_1$.

In other embodiments, the base station 135 additionally broadcasts a reference signal periodically to indicate a reference position for determining the position and/or orientation of the object. The reference signals are broadcasted at the same frequency as the rotational speed of the two light beams. In one embodiment, a synchronization signal includes a radio frequency (RF) pulse. The base station 135 includes an illumination source, an optical module, and a rotor assembly. In other embodiments, the base station 135 comprises additional or fewer modules than those described herein. Similarly, the functions can be distributed among the modules and/or different entities (e.g., the console 110) in a different manner than is described here.

The illumination source emits at least one source light beam. The at least one source light beam is the source of the light beams that exit the base station 135. The at least one source light beam is optically processed into multiple light beams that exit the base station. The illumination source is positioned such that its center is aligned with a rotation axis around which the rotor assembly rotates. Accordingly, the at least one source light beam traverses along the rotation axis. The illumination source emits light having different wavelengths such as those in the visible band (~380 nm to 750 nm), in the infrared (IR) band (~750 nm to 1 mm), in the ultraviolet band (~10 nm to 380 nm), some other portion of the electromagnetic spectrum, or some combination thereof. In some embodiments, the illumination source emits light that is in the IR band. The illumination source may include an LED such as a high power LED or a laser LED, or other light sources.

The optical module receives the source light beam and divides the source light beam into at least two light beams. The at least two light beams are separated from each other by an angle in a plane that is orthogonal to the rotation axis. The angle has a constant value that may be preconfigured. The plane that is orthogonal to the rotation axis is hereinafter referred to as "the orthogonal plane." The optical module may include optical elements such as a Fresnel lens, a convex lens, a concave lens, and the like that collimate the at least two light beams before they exit the base station 135. In some embodiments, the at least two beams that exit the base station 135 are shaped in planar sheets. The light beams that are shaped in planar sheets are hereinafter referred to as "planar sheet beams." A planar sheet beam may be tilted with reference to the orthogonal plane. In other embodiments, the at least two beams that exit the base station 135 are collimated beams. In some embodiments, the optical module divides the source light beam into two light beams. In others, the optical module divides the source light beam into three light beams. The optical module is positioned such that its center overlaps a center of rotation.

The rotor assembly rotates at least a portion of the optical module around the rotation axis such that the at least two light beams are output from the base station 135 in a direction that rotates around the rotation axis. The rotor assembly includes at least one rotor and a rotational speed determination module. The rotational speed determination module determines the rotational speeds of the light beams emitted by the base station 135. For example, the rotational speed determination module identifies one or more other base stations in a local area and selects the rotational speeds that are different from the rotational speeds of detected base stations. The illumination source, the optical module, and the rotor assembly are further described in detail with respect to FIGS. 2A and 3.

The HMD 105 is a head-mounted display that presents media to a user. The media presented by the HMD 105 include visual and/or audio media content. In some embodiments, audio content is presented via an external device (e.g., speakers and/or headphones) that receives data including the audio content from the HMD 105, the console 110, or both, and presents the audio content based on the data. An embodiment of the HMD 105 is further described below with reference to FIG. 5. The HMD 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. In some embodiments, the HMD 105 may also act as an AR and/or MR HMD. In these embodiments, the HMD 105 augments views of a physical, real-world environment with computer-generated elements (e.g., images, video, sound, etc.)

The HMD 105 includes a display 115 and multiple detectors 120. The display 115 displays 2D or 3D images to the user in accordance with data received from the console 110. In some embodiments, the display 115 includes a display block and an optics block. The display block includes a single electronic display panel or multiple electronic display panels (e.g., a display panel for each eye of a user). Examples of the electronic display panel include: a liquid crystal display (LCD), an organic light emitting diode (OLED) display, an active-matrix organic light-emitting diode display (AMOLED), some other display, or some combination thereof. In some embodiments, portions (e.g., a front side) of the HMD 105 are transparent to visible light thereby to allow a user of the headset to view the local area through those portions. In these embodiments, the display 115 is made up of one or more transparent electronic display panels. A transparent electronic display panel is partially or fully transparent and may be, for example, a transparent organic light emitting diode display (TOLED), some other transparent electronic display, or some combination thereof.

The optics block includes one or more optical elements that transmit images from the display block to eyes of the user. The optics block magnifies image light received from the display block, corrects optical errors associated with the image light, and presents the corrected image light to a user of the HMD 105. In various embodiments, the optics block includes one or more optical elements. Example optical elements included in the optics block include: an aperture, a Fresnel lens, a convex lens, a concave lens, a filter, a mirror element, or any other suitable optical element that affects image light. Moreover, the optics block may include combinations of different optical elements. In some embodiments, one or more of the optical elements in the optics block may have one or more coatings, such as anti-reflective coatings.

The optics block may magnify and focus image light thereby to allow using a display block that is physically smaller and lighter in weight, and consumes less power than using a display block without any magnification or focusing when presenting the same content. Additionally, magnification may increase the field of view of the content presented by the HMD 105. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block may be designed to correct one or more types of optical error. Examples of optical error include barrel distortions, pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 115 for display is pre-distorted, and the optics block corrects the distortion when it receives image light from the display block generated based on the content. In some embodiments, some or all of the functionality of the display block is part of the optics block or vice versa.

The detectors 120 detect signals (e.g., light beams, acoustic signals) emitted from the base station 135. In some embodiments, responsive to being illuminated, the detectors 120 output illumination data. Illumination data is data that includes illumination information of the detectors 120. The illumination data includes a starting time point of illumination, an end time point of illumination, an intensity of illumination, other characteristics of illumination, or some combination thereof. In some embodiments, the detectors 120 include a photodetector (e.g., a photodiode, a phototransistor) that detects light and converts detected photons into electrical signals. The detectors 120 are configured to detect light emitted by the base station 135. The detectors 120 together output illumination data that provide information as to an orientation and position of the HMD 105. For example, an exposure interval can be determined from a starting time point and an end time point. As another example, an incident angle of a light beam on a detector 120 can be determined from an intensity of illumination. The exposure interval of illumination and/or the incident angle can be used to determine an orientation and position of the HMD 150.

The detectors 120 are located in specific positions on an object such as the HMD 105 relative to each other such that they together output illumination data for determining an orientation of the object. Specifically, on each surface of the HMD 105, multiple detectors are placed relative to each other such that these detectors output illumination data for determining an orientation of the surface. As one example, the HMD 105 includes 5 exterior surfaces (i.e., a top surface, a bottom surface, a left surface, a right surface, and a front surface) and at least three detectors 120 are positioned on each exterior surface of the HMD 105 to determine a six degrees of freedom of movement of the HMD 105. In some embodiments, on one or more exterior surface, the detectors 120 are equally spaced. The detectors may be placed on the exterior surface such that they are not visible to users. For example, an exterior surface may include openings (e.g., holes) for housing the detectors 120. The exterior surface may also include apertures or sections that are transparent in the band of light emitted by the base station 135 to allow all light or light of certain wavelengths to reach the detectors 120.

In some embodiments, the HMD 105 may further include one or more motion sensors 125 and an inertial measurement unit (IMU) 130. The IMU 130 is an electronic device that generates IMU position data based on measurement signals received from one or more of the motion sensors 125. A motion sensor 125 generates one or more measurement signals in response to motion of the HMD 105. Examples of motion sensors 125 include: one or more accelerometers, one or more gyroscopes, one or more magnetometers, another suitable type of sensor that detects motion, a type of sensor used for error correction of the IMU 130, or some combination thereof. The motion sensors 125 may be located external to the IMU 130, internal to the IMU 130, or some combination thereof.

Based on the one or more measurement signals from one or more motion sensors 125, the IMU 130 generates IMU position data indicating an estimated position of the HMD 105 relative to an initial position of the HMD 105. For example, the motion sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the IMU position data. The reference point is a point that may be used to describe the position of the HMD 105. The reference point may generally be defined as a point in space; however, in practice the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The interface device 140 is a device that allows a user to send action requests to the console 110. An action request is a request to perform a particular action. For example, an action request may be to start or end an application or to perform a particular action within the application. The interface device 140 may include one or more input devices. Example input devices include: a keyboard, a mouse, a game controller, a wearable instrument (e.g., a wristband, a glove, a knee pad, etc.), or any other suitable device for receiving action requests and communicating the received action requests to the console 110. An action request received by the interface device 140 is communicated to the console 110, which performs an action corresponding to the action request. In some embodiments, the interface device 140 may provide haptic feedback to the user in accordance with instructions received from the console 110. For example, haptic feedback is provided when an action request is received, or the console 110 communicates instructions to the interface device 140 causing the interface device 140 to generate haptic feedback when the console 110 performs an action. The interface device 140 can also include one or more detectors 120 to enable the system 100 to track positions of the interface device 140, similar to the positional tracking of the HMD 105 as described herein.

The console 110 provides media to the HMD 105 for presentation to the user in accordance with information received from one or more of: the base station 135, the HMD 105, and the interface device 140. In the example shown in FIG. 1, the console 110 includes an application store 145, a tracking module 150, an engine 155, and a memory module 160. Similarly, the functions can be distributed among the modules and/or different entities (e.g., the HMD 105) in a different manner than is described here. For example, some (e.g., the tracking module 150) or all (i.e., the console is part of the HMD 105) of the modules may be part of the HMD 105.

The application store 145 stores one or more applications for execution by the console 110. An application is a group of instructions, that when executed by a processor, generates content for presentation to the user. Content generated by an application may be in response to inputs received from the user via movement of the HMD 105 or the interface device 140. Examples of an application include: a gaming application, a conferencing application, or a video playback application.

The tracking module 150 calibrates the system 100 using one or more calibration parameters and may adjust one or more calibration parameters to reduce error in determination of the position of the HMD 105. Moreover, calibration performed by the tracking module 150 also accounts for information received from the motion sensors 125 and/or the IMU 130.

During calibration, the tracking module 150 identifies one or more base stations 135 that emit light beams illuminating a local area. As one example, the tracking module 150 receives information including rotational speeds from one or more base stations 135 thereby to identify the base stations 135. The tracking module 150 may receive the information directly from a base station 135 or indirectly from another module of the console 110 that is in communication with the base station 135. As another example, the tracking module 150 detects light beams emitted by the one or more base stations 135 and determines rotational speeds of the detected light beams. Because a base station emits light beams that rotate at a rotational speed unique to the base station, the tracking module 150 can identify the one or more base stations 135 using the identified rotational speeds. As a further example, the tracking module 150 receives illumination data corresponding to the illumination by light beams emitted by the one or more base stations 135. The illumination data is generated by objects such as the HMD 105 in the local area. The tracking module 150 analyzes temporal relationships of the illumination data to identify rotational speeds of the light beams thereby to identify the base stations 135. In some embodiments, the tracking module 150 assigns each identified base station 135 a unique base station identifier. For each identified base station, the tracking module 150 may further determine a location of the base station relative to the tracking module 150.

The tracking module 150 tracks movements of the objects in the local area using the illumination data. For example, the tracking module 150 applies a model to the illumination data to determine an orientation of the HMD 105. The model observes relationships between illumination data and corresponding orientation of the HMD 105. For example, the model includes a spatial model of detector locations relative to a reference vector (e.g., a known position inside the tracked object). The tracking module 150 warps the model to illumination data to determine an orientation of the HMD 105. The tracking module 150 compares observed illumination timings to the model to determine an orientation and position of the tracked object relative to a base station. The tracking module 150 may select the model based on a location of the base station, the first rotational speed, and/or the offset angle. The tracking module 150 may obtain a model from a library that includes models developed for different types of HMDs 105 and calibrate the model based on calibrated features of the base station 135 such as precise lens alignment or rotational parameters. Alternatively, for a particular base station 135, the tracking module 150 may also create a model for the HMD 105. For example, the tracking module 150 develops and/or updates the model using illumination data collected when the HMD 105 is at different positions for the purpose of online calibration. IMU position data can also be used for positional tracking. The tracking module 150 also determines positions of a reference point of the HMD 105 using position information from the IMU position data. Additionally, in some embodiments, the tracking module 150 may use portions of the illumination data, IMU position data or some combination thereof, to predict a future position of the HMD 105. The tracking module 150 provides the estimated or predicted future position of the HMD 105 to the engine 155.

The tracking module 150 identifies illumination data to be used for positional tracking. From illumination data generated by the HMD 105, the tracking module 150 determines illumination data generated responsive to illumination by light beams emitted by a particular base station. The tracking module 150 determines illumination data generated responsive to illumination by outgoing beams emitted by the particular base station. The tracking module 150 analyzes temporal relationships of the captured illumination data to determine rotational speeds thereby to make the determination. In some embodiments, the tracking module 150 may further analyze intensity information in the captured illumination data to assist in the determination.

In some embodiments, the console 110 calibrates the base station 135, the HMD 105, and/or the interface device 140. The console 110 provides calibration parameters to one or more of the base station 135, the detectors 120, the motion sensors 125, and the IMU 130 for calibration. For example, a user follows instructions displayed on the display 115 to position the HMD 105 into predetermined positions. The console 110 provides instructions for display on the display 115 to prompt the user to position the HMD 105 into predetermined positions, and records illumination data outputted by the HMD 105 at each predetermined position.

The engine 155 executes applications within the system environment 100 and receives position information, acceleration information, velocity information, predicted future positions, or some combination thereof of the HMD 105 from the tracking module 150. Based on the received information, the engine 155 determines content to provide to the HMD 105 for presentation to the user. For example, if the received information indicates that the user has looked to the left, the engine 155 generates content for the HMD 105 that mirrors the user's movement in a virtual environment. Additionally, the engine 155 performs an action within an application executing on the console 110 in response to an action request received from the interface device 140 and provides feedback to the user that the action was performed. The provided feedback may be visual or audible feedback via the HMD 105 or haptic feedback via the interface device 140.

The memory module 160 stores instructions for execution by the console 110 and stores data used by the console 110. The instructions, when executed by a processor, cause the console 110 to perform operations such as receiving illumination data, identifying illumination data to use for determining an orientation of an object in a local area, identifying base stations, selecting rotational speeds for different base stations, determining the orientation of the object in the local area, selecting models for determining the orientation of the object, calibrating objects, devices, and/or other modules, and the like. The memory module 160 includes a non-transitory computer-readable storage medium such as a hard drive, compact disk read-only memory (CD-ROM), DVD, or a solid-state memory device.

The system 100 can also track other objects that are in the local area but not part of the system 100. For example, the system 100 can track a position of a personal item (e.g., a remote controller, a key, etc.) in the local area. The base station 135 described can be used separately from the system 100. The base station 135 can also be integrated with other devices such as a home assistant.

In alternative configurations, the console 110 selects rotational speeds for base stations 135. For each base station 135 in a local area, the console 110 selects a unique rotational speed $\omega_1$. A base station 135 emits light beams that rotate at a rotational speed selected by the console 110. The console 110 includes a rotational speed determination module. A base station 135 may not include a rotational speed determination module.

Figure 2A:
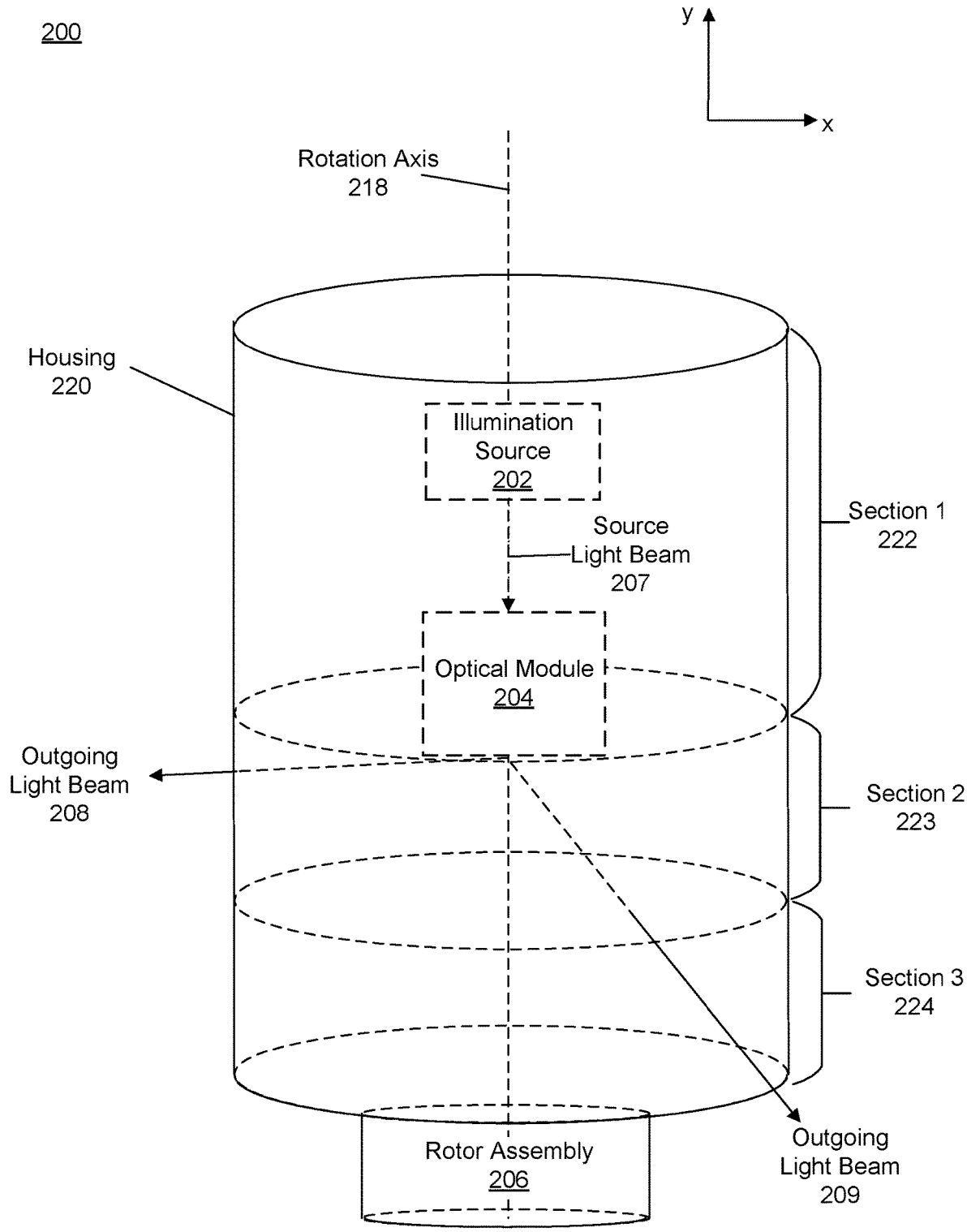
FIG. 2A is an isometric view of an example base station, in accordance with an embodiment.

FIG. 2A is an isometric view of an example base station 200, in accordance with an embodiment. The example base station 200 is an embodiment of the base station 135, and includes an illumination source 202, an optical module 204, and a rotor assembly 206. At least the illumination source 202 and the optical module 204 are enclosed by a housing 220. In the illustrated example, the rotor assembly 206 is external to the housing 220. However, the rotor assembly 206 can also be completely or partially enclosed by the housing 220. The rotor assembly 206 is configured to drive the optical module 204 to rotate about a rotation axis 218. The rotor assembly 206 may also drive the entire housing 220 or a portion of the housing 220 to rotate. The housing 220 is shaped such that its rotation does not cause vibration or disturbance forces to the rotor assembly 206. For example, the housing is cylindrically-shaped. The housing 220 includes one or more apertures or sections that are transparent to allow light to pass through thereby to exit the housing 220. A transparent section may allow light of some wavelengths to pass through while blocking light of other wavelengths. The rest of the housing 220 may be of materials that are substantially opaque to visible light. For example, in the illustrated example, the housing includes a section 222 that is not transmissive to light emitted by the illumination source 202 and a section 223 that is transmissive.

The illumination source 202 emits a source light beam 207. In various embodiments, the illumination source 202 is positioned such that its center is aligned with the rotation axis 218 and the source light beam 207 traverses along the rotation axis 218. The illumination source 202 includes a laser source that emits light. As noted above, the light may be in the IR band, the visible band, the UV band, or some combination thereof. For example, the source light beam 207 has a wavelength in the range of 750 to 940 nanometers (nm). The illumination source 202 is optically coupled to the optical module 204. The illumination source 202 can include an optical element such as a Fresnel lens, a convex lens, a concave lens, and the like that collimates the light beam 207. Adjusting the optical element can adjust a location of the beam waist of the light beam 207.

The optical module 204 divides the source light beam 207 into at least two output light beams. The output light beams of the optical module 204 may be further optically processed before exiting the housing 220 as the outgoing light beams 208, 209. The light beams 208 and 209 illuminate a local area where one or more objects are located. The optical module 204 is positioned such that the rotation axis 218 passes through a center of the optical module 204. In various embodiments, the source light beam 207 is a collimated beam. In some embodiments, the source light beam 207 is divided and processed such that the outgoing light beams 208, 209 are planar sheet beams. The outgoing light beams 208, 209 are separated by an angle in the orthogonal plane as further described below. This angle is also referred herein as an offset angle. In addition, the outgoing light beams 208, 209 are tilted with respect to the orthogonal plane by predetermined angles as further described below. In some embodiments, the optical module further divides the source light beam 207 to include an asymmetric light beam (not shown). The asymmetric light beam may be further processed into a planar sheet beam.

The optical module 204 may include one or more prisms, mirrors, and/or other optical elements that alter how light propagates thereby to separate a single light beam into multiple light beams. For example, in one embodiment, the optical module 204 includes a prism including materials of different refraction indexes such that it separates an incoming light beam into at least two separate light beams that are further optically processed into the outgoing light beams 208, 209. In another embodiment, the optical module 204 includes two beam splitters that are coupled in series. A first beam splitter separates the source light beam 207 into two light beams one of which is further separated into another two light beams by a second beam splitter. As another example, the optical module 204 includes a diffractive beam splitter and a mirror optically coupled to the beam splitter. The beam splitter separates the source light beam 207 into two separate light beams one of which is further optically processed into the asymmetric light beam, and the other one of which is reflected by the mirror back to the beam splitter and further separated into another two light beams which are further optically processed into the outgoing light beams 208, 209. In some embodiments, the optical module 204 further includes one or more optical elements for shaping the light beams 208, 209 as well as the asymmetric light beam if it is present. In some embodiments, the optical module 204 includes optical elements such as one or more cylindrical lenses, Fresnel lenses, or some other optical elements, that convert light into a planar sheet.

In some embodiments, the rotor assembly 206 rotates the optical module 204 to rotate around the rotation axis 218 such that the separate outgoing light beams 208, 209 rotate around the rotation axis 218 at a rotational speed. The rotor assembly 206 includes at least one rotor (not shown). In some embodiments, the rotor assembly 206 rotates different portions of the optical module 204 to rotate around the rotation axis 218 at different rotational speeds such that the separate outgoing light beams 208, 209, as well as the asymmetric light beam exit the housing 220 at different rotational speeds. The rotor assembly 206 includes at least one rotor (not shown). The reference signal is used to indicate to the detectors 120 a reference time for determining an orientation and/or position of the detectors 120.

Figure 2B:
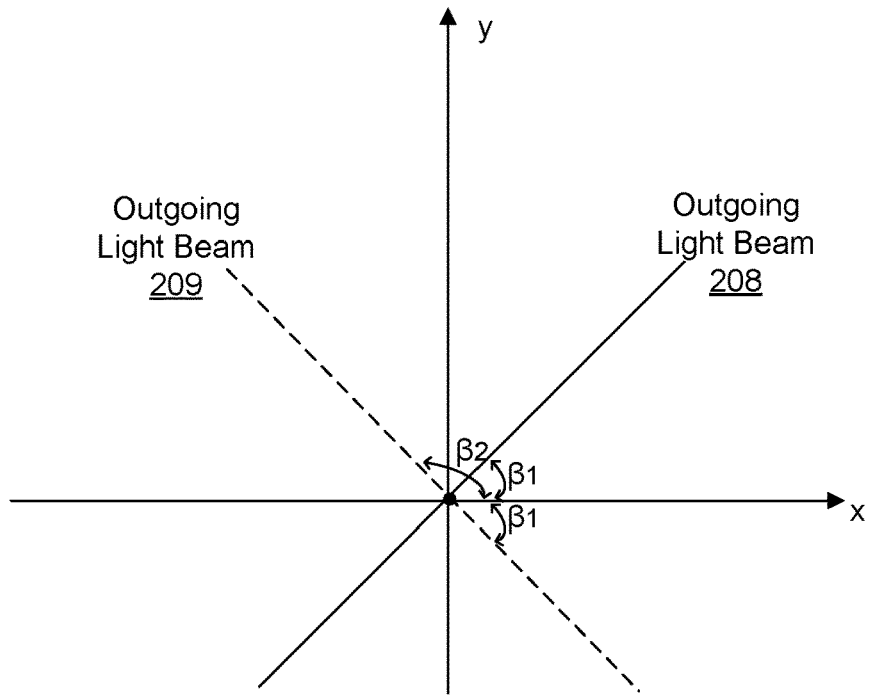
FIG. 2B is an orthogonal projected view of the outgoing light beams illustrated in FIG. 2A viewed at two separate times, in accordance with an embodiment.

FIG. 2B is an orthogonal projected view 240 of the outgoing light beams 208, 209 illustrated in FIG. 2A viewed at two separate times, in accordance with an embodiment. In the view 240, the y-axis overlaps with the rotational axis 218, and the x-axis is parallel to a horizontal reference for the base station. The view 240 is looking back towards the base station 200 from a static position. At time $t_1$, the outgoing light beam 208 appears as a planar sheet at an angle $\beta_1$ from the x-axis. At a later time, $t_2$, the outgoing light beam 209 appears as a planar sheet at an angle $\beta_2$ from the x-axis. The angles $\beta_1$, $\beta_2$ are supplementary. The angles $\beta_1$, $\beta_2$ can be adjusted to adjust a field of view. The outgoing light beams 208, 209 appear at the illustrated position every time interval $T_1$ ($1/\omega_1$).

Figure 2C:
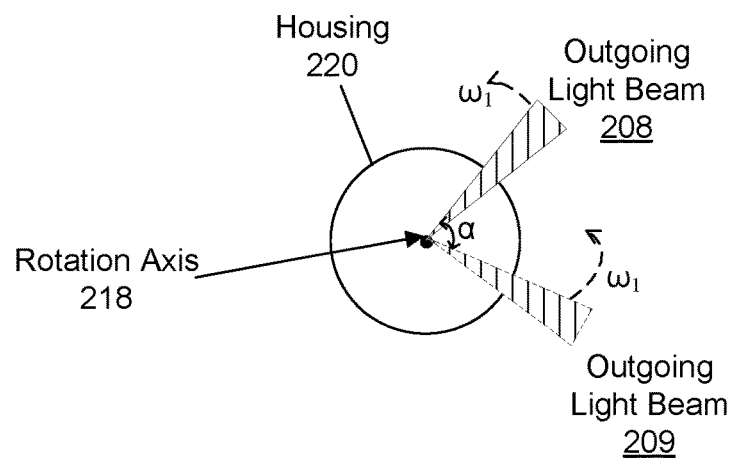
FIG. 2C is a top view of the base station illustrated in FIG. 2A, where the central dot represents the location of the rotation axis, in accordance with an embodiment.

FIG. 2C is a top view of the base station 200 illustrated in FIG. 2A, where the central dot represents the location of the rotation axis 218. The light beams 208, 209 are illustrated in triangles because they are planar sheet beams and tilted with respect to the orthogonal plane. The outgoing light beams 208 and 209 are offset by an angle $\alpha$ in the orthogonal plane. Because the outgoing light beams 208 and 209 rotate around the rotation axis 218 at the same rotational speed $\omega_1$, this offset angle $\alpha$ is maintained between them. For each individual detector of the multiple detectors that are located on one surface, a time interval between the outgoing beams 208, 209 illuminating the individual detector can be recorded. Because the relative locations of the detectors and the offset angle $\alpha$ are known, the surface's tilt with respect to a vertical reference axis can be determined. In some embodiments, a polar angle of each individual detector with reference to this origin is determined.

The outgoing beams 208 and 209 are tilted with respect to the orthogonal plane. Because the outgoing beams 208, 209 are planar sheet beams, the planes defined by the outgoing beams 208, 209 sweep the local area when the outgoing beams 208, 209 rotate throughout the local area. For each individual detector of the multiple detectors that are located on one surface, a terminal interval between the outgoing beams 208, 209 illuminating the individual detector is recorded. Because the relative locations of the detectors, the offset angle $\alpha$, and the tilt of each beam with respect to the orthogonal plane are known, the surface's tilt with respect to the orthogonal plane can be determined.

Figure 3:
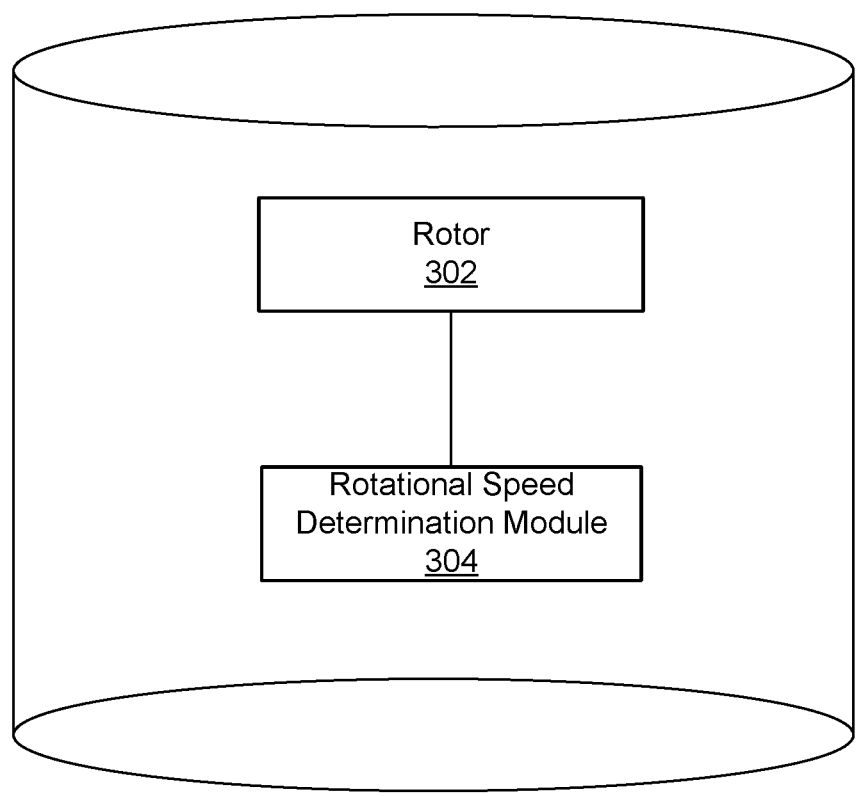
FIG. 3 is a block diagram of an example rotor assembly, in accordance with an embodiment.

FIG. 3 is a block diagram of an example rotor assembly 300, in accordance with an embodiment. The example rotor assembly 300 can be the rotor assembly 206 illustrated in FIG. 2A. The rotor assembly 300 includes a rotor 302 and a rotational speed determination module 304. The rotor 302 rotates around a rotation axis and drives one or more components of a base station 135 to rotate around the rotation axis 218. The rotor 302 rotates around the rotation axis at a rotational speed. The rotational speed determination module 304 selects the rotational speed at which the rotor 302 rotates around the rotation axis. For example, the rotational speed determination module 304 selects a rotational speed of the outgoing light beams that is different from rotational speeds of light beams emitted by one or more other base stations for illuminating a local area. The rotational speed determination module 304 can further select a second rotational speed of the asymmetric light beam that is different from rotational speeds of light beams emitted by one or more other base stations for illuminating a local area. The rotational speeds are selected such that light beams emitted by one base station 135 rotate at a different speed from other light beams emitted by one or more base stations within a local area. The rotational speeds can be selected from a set of predetermined rotational speeds.

The rotational speed determination module 304 detects one or more other base stations emitting light beams illuminating the local area. The detection can be realized in a variety of ways. As one example, the rotational speed determination module 304 receives the identification of other base stations from the console 110. The rotational speed determination module 304 is in communication with the console 110 that is in communication with the one or more other base stations. As another example, the rotational speed determination module 304 is in communication with the one or more other base stations, for example, via a network. The rotational speed determination module 304 detects the one or more other base stations by their network ID. As a further example, the rotational speed determination module 304 detects rotational beams emitted by the one or more other base stations thereby to determine the one or more other base stations.

Figure 4A:
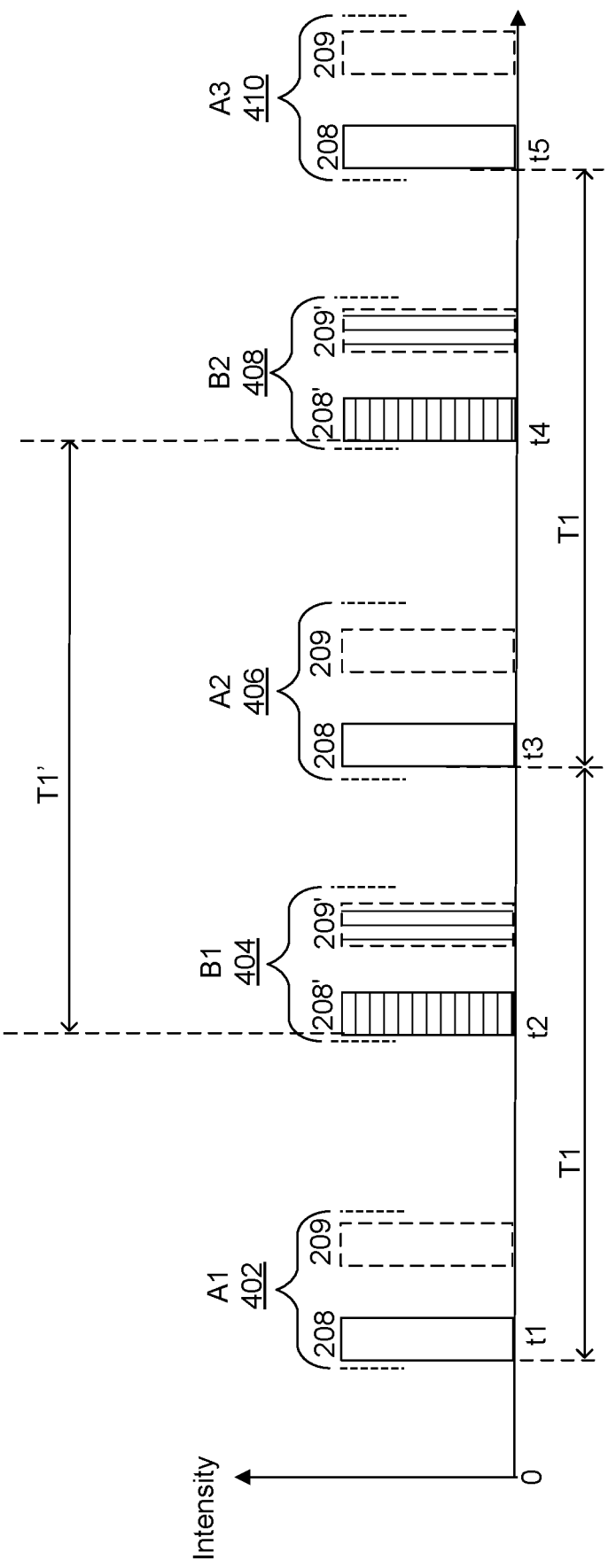
FIG. 4A is a timing diagram of illumination data generated corresponding to light beams observed at a particular detector, in accordance with an embodiment.

The rotational speed determination module 304 determines rotational speeds of light beams emitted by the one or more base stations. For example, the rotational speed determination module 304 receives the rotational speeds from the console 110. Alternatively, the rotational speed determination module 304 receives the rotational speeds from the one or more other base stations, for example, via a network. As a further example, the rotational speed determination module 304 detects and analyzes light beams emitted by the one or more other base stations to determine the rotational speeds of light beams emitted by the one or more other base stations. If no other base stations are detected, the rotational speed determination module 304 selects from a set of predetermined rotational speeds are or more rotational speeds for the particular base station. In various embodiments, the rotational speeds are selected such that a difference between the rotational speeds for any two base stations is at least a threshold rotational speed difference. FIG. 4A is a timing diagram of illumination data generated corresponding to light beams observed at a particular detector, in accordance with an embodiment. In the example illustrated in FIG. 4A, the detector's location and position both did not move. The observed intensity is assumed to be the same for all instances of illumination. In the illustrated example, two base stations emit light beams to illuminate a local area where an object such as the HMD 105 or the interface device 140 is located. The object reflects the light beams emitted by the base stations. The detector observes the light beams and generates illumination data. In the illustrated example, the series of illumination data 402, 406, 410 is generated responsive to illumination by light beams emitted by a base station 135A. The base station 135A emits outgoing light beams 208, 209. The series of illumination data 404, 408 is generated responsive to illumination by beams corresponding to light beams emitted by a base station 135B. The base station 135B emits outgoing light beams 208', 209'. Accordingly, an orientation of the object including the particular detector can be determined with respect to the first base station 135A using illumination data 402, 406, and 410. An orientation of the object including the particular detector can be determined with respect to the second base station 135B using illumination data 404 and 408.

To correctly determine the orientation of the object, illumination data and a particular base station is identified. Because light beams emitted by different base stations rotate at different rotational speeds, the correspondence between illumination data 402, 404, 406, 408, 410 and their corresponding base stations can be determined and tracked. For example, as the detector is illuminated by multiple beams at time points $t_1$ through $t_5$, it generates illumination data having starting time points $t_1$ through $t_5$. For the purpose of this discussion, the end time points are not marked. By emitting light beams at different rotational speeds, the light beams emitted by different base stations can be separated and the corresponding illumination data can be identified.

The tracking module 150 analyzes the temporal relationships of the captured illumination data to distinguish and separate illumination data generated in response to different series of light beams. For example, the tracking module 150 calculates the time period of recurring illumination data. For example, the tracking module 150 detects that different sets of illumination data is generated every time interval $T_1$, $T_1'$, and calculates these time intervals. The tracking module 150 determines that two series of illumination data is generated every time interval $T_1 (1/\omega_1)$, and another two series of illumination data is generated every time interval $T_1' (1/\omega_1')$. The tracking module 150 determines that the light beams are emitted by two different base stations because each base station emits at least two light beams which rotate at a known rotational speed. The tracking module 150 analyzes the two series of illumination data generated every time interval $T_1$ to determine an orientation of object in reference to the first base station. The tracking module 150 analyzes the two series of illumination data generated every time interval $T_1'$ to determine an orientation of object in reference to the second base station.

Figure 4B:
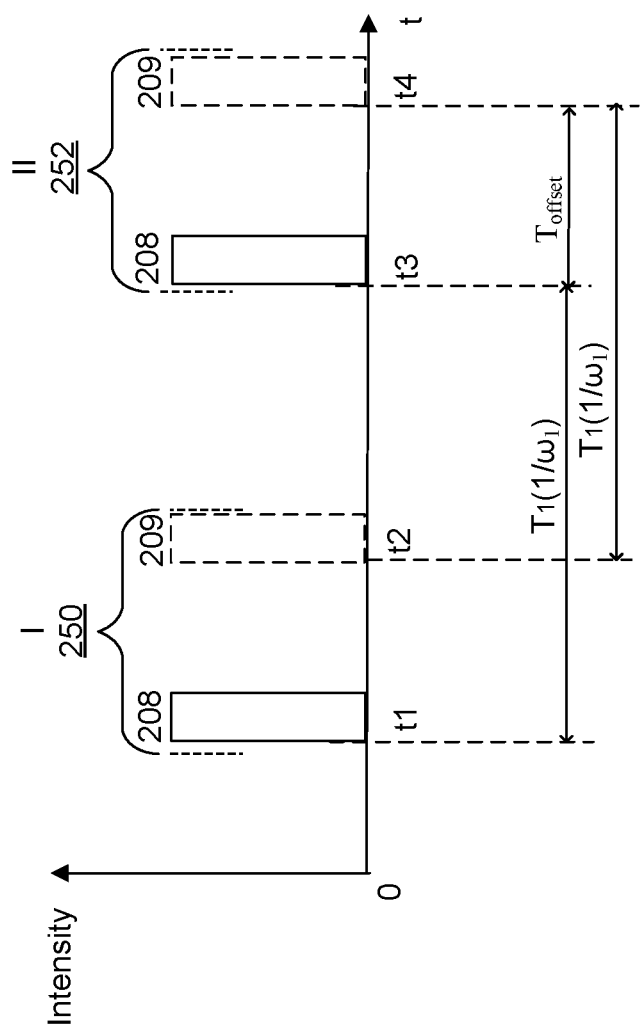
FIG. 4B is a timing diagram of illumination data generated corresponding to light beams observed at a particular detector.

FIG. 4B is a timing diagram of illumination data generated corresponding to light beams observed at a particular detector, in accordance with an embodiment. In the example illustrated in FIG. 4B, the detector's location and position both did not move. The observed intensity is assumed to be the same for all instances of illumination. An orientation of the surface on which the particular detector can be determined using outgoing light beams 208, 209 that are separated by an offset angle $\alpha$. In the illustrated example, the tracking module 150 determines that the pair 250 of outgoing light beams 208, 209 are separated by the offset angle and the pair 252 of outgoing light beams 208, 208 are separated by the offset angle.

By analyzing the temporal relationships of the captured illumination data, the tracking module 150 can distinguish a series of light beams from the other series of light beams. In particular, the tracking module 150 detects a series of light beams every time interval $T_1$ $(1/\omega_1)$ and detects the two other series of light beams every time interval $T_1'$ $(1/\omega_1')$ that is different from $T_1$. Because the base stations associated with the rotational frequency $\omega_1$ and $\omega_1'$ are known, the tracking module 150 associates each series of light beams with a corresponding base station thereby to calculate a location and a position with respect to each base station. Furthermore, the tracking module 150 determines that the two series of light beams are separated by an offset time interval. The tracking module 150 further determines the offset time interval $T_{offset}$ $(\alpha * T_1)$ from the illumination data. The offset time interval and the illumination data along with relative locations between multiple detectors 120 can be used to determine the orientation of the HMD 105 as described above.

Figure 5:
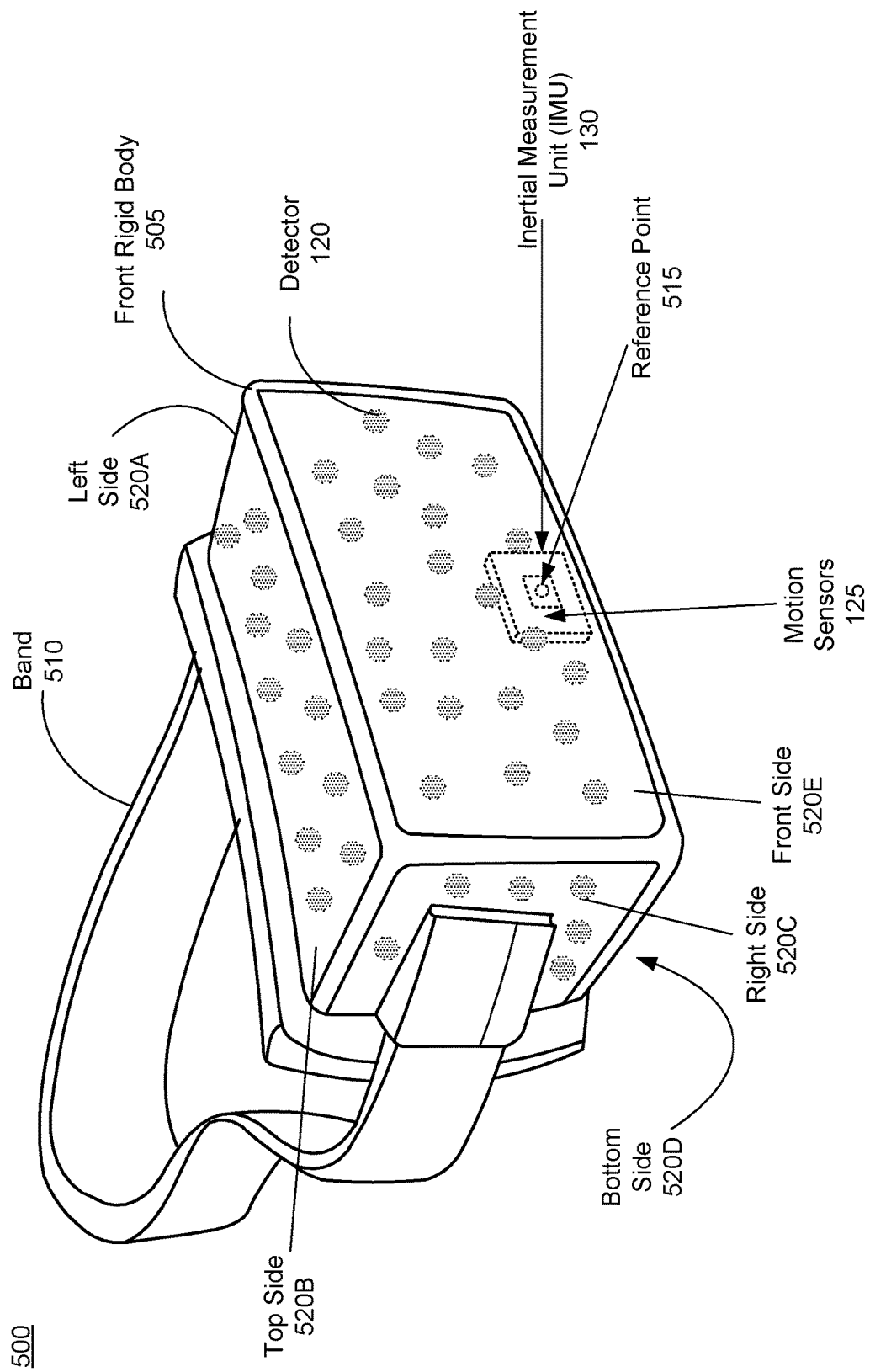
FIG. 5 is a diagram of an HMD, in accordance with an embodiment.

FIG. 5 is a diagram of a HMD 105, in accordance with an embodiment. The HMD 500 is an embodiment of the HMD 105, and includes a front rigid body 505 and a band 510. The front rigid body 505 includes one or more electronic display elements of the display 115 (not shown in FIG. 5) and the detectors 120. The illustrated example shows the detectors 120 that are positioned on the surfaces of the front side 520E, the top side 520B, and the right side 520C. The detectors that are positioned on the other surfaces of the other sides (e.g., the left side 520A, the bottom side 520D) are not shown. In other embodiments, the detectors 120 are not positioned on the exterior surface of the HMD 105 such that they not visible to a user.

The front rigid body 505 may further include the IMU 130 and/or the one or more motion sensors 125. In the embodiment shown by FIG. 5, the motion sensors 125 are located within the IMU 130, and neither the IMU 130 nor the motion sensors 125 are visible to the user. In the illustrated example, the reference point 515 is located at the center of the IMU 130. Note that the headset 500 may be modified to work as an AR headset.

Figure 6A:
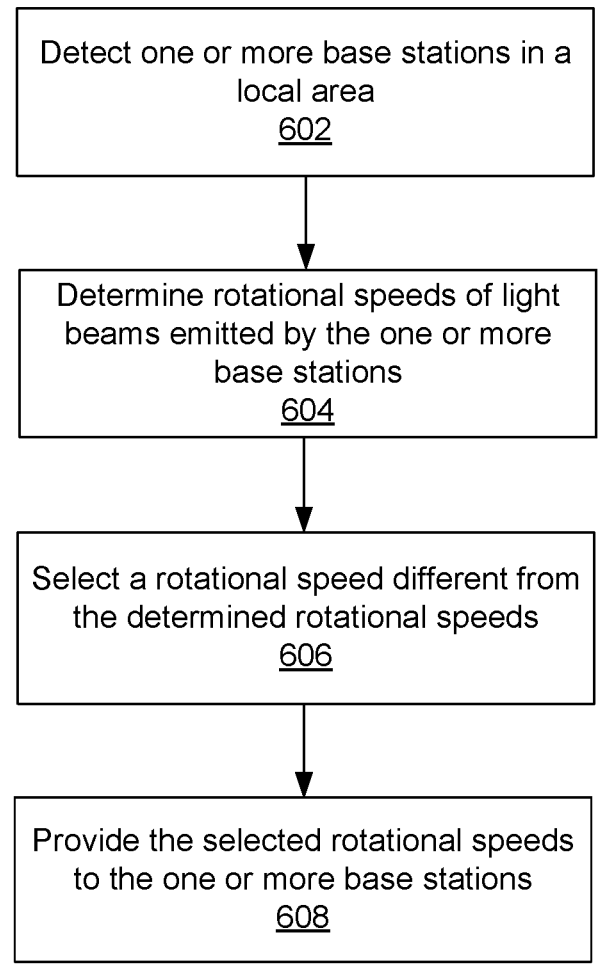
FIG. 6A is a flow chart of an example process of the base station determining rotational speeds at which light beams emitted by the base station rotate around a rotation axis, according to one embodiment.

FIG. 6A is a flow chart of an example process of the base station 135A determining rotational speeds at which light beams emitted by the base station 135A rotate around a rotation axis, according to one embodiment. The base station 135A detects 602 one or more other base stations 135B-135N in a local area. The base station 135A and the one or more other base stations 135B-135N emit light beams illuminating the local area. The base station 135A can detect the other base stations 135B-135N via the console 110 or via a network. Alternatively, the base station 135A detects the other base stations 135B-N by detecting light beams emitted by the other base stations 135B-135N. Details of the detection are provided previously with respect to FIG. 3.

The base station 135A determines 604 one or more rotational speeds of the light beams emitted by the one or more other base stations 135B-135N. For example, the base station 135A receives information including the rotational speeds from the console 110 or from the one or more other base stations 135B-135N. Alternatively, the base station 135A analyzes the light beams emitted by the other base stations 135B-135N to determine the rotational speeds. Details of the determination are provided previously with respect to FIG. 3.

The base station 135A selects 606 a rotational speed different from the rotational speeds of light beams emitted by the one or more other base stations 135B-135N. That is, the light beams emitted by the base station 135A rotate at a different speed from the light beams emitted by the one or more other base stations 135B-135N. Details of the selection are provided previously with respect to FIG. 3.

The base station 135A provides 608 the selected rotational speed(s) to the one or more other base stations 135B-135N. Alternatively or additionally, the base station 135A provides the selected rotational speeds to the console 110. The selected rotational speeds are used for identifying the base station 135A.

Figure 6B:
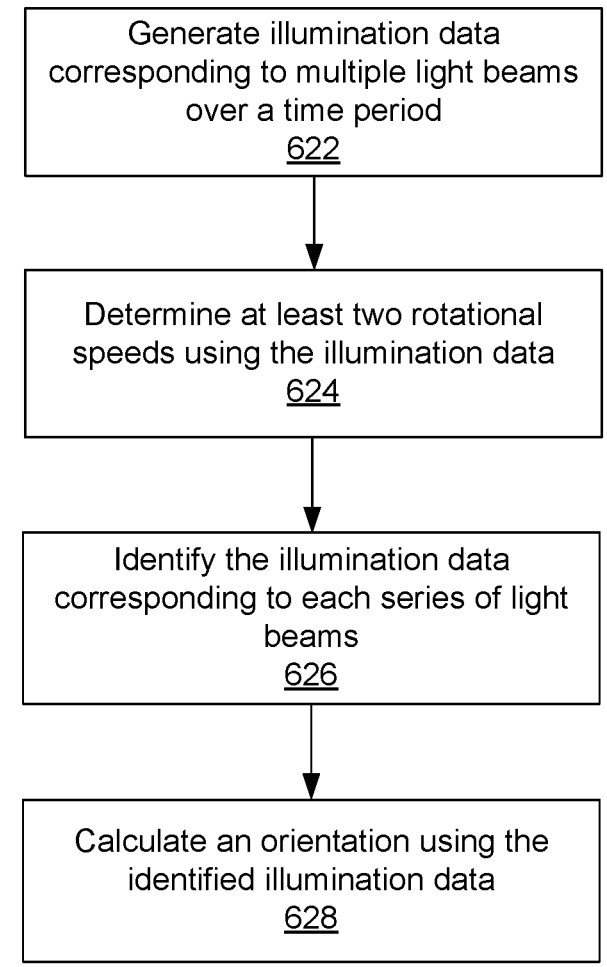
FIG. 6B is a flow chart of an example process for the system to determine an orientation of an object in a local area, according to one embodiment.

FIG. 6B is a flow chart of an example process for the system 100 to determine an orientation of an object in a local area, according to one embodiment. The system 100 generates 622 illumination data corresponding to multiple light beams over a time period. Specifically, multiple base stations emit the multiple light beams to illuminate a local area where the object is located. The object such as the HMD 105 detects the illumination and generates illumination data responsive to the illumination. The illumination data includes a starting time point of illumination, an end time point of illumination, an intensity of illumination, other characteristics of illumination, or some combination thereof. In some embodiments, the multiple light beams include two pairs of rotational light beams for orientation determination. The two light beams for orientation determination are separated by an offset angle. The two light beams are planar sheet beams and tilted with respect to the orthogonal plane at opposite directions. In some embodiments, the multiple light beams include a first asymmetric light beam and corresponding two rotational light beams for orientation determination, and a second asymmetric light beam and corresponding two rotational light beams for orientation determination. In some embodiments, the object processes the illumination data. In other embodiments, the object provides the illumination data to the console 110 (e.g., the tracking module 150) for further processing.

The system 100 determines 624 at least two rotational speeds using the illumination data. To facilitate the description hereinafter, an example of two base stations 135A, 135B is used. For example, the tracking module 150 processes the illumination data and determines that two series of data occurs every time interval $T_1$, and another two series of data occurs every time interval $T_2$. Using the determined time intervals, the tracking module 150 determines rotational speeds $\omega_1(1/T_1)$ and $\omega_1'(1/T_1')$. In some embodiments, the system 100 determine 624 the rotational speeds by identifying the rotational speeds from a set of known predetermined rotational speeds.

The system 100 identifies 626 the illumination data corresponding to each series of light beams. For example, the tracking module 150 identifies the two series of data that occurs every time interval $T_1$ and the two series of data that occurs every time interval $T_1'$ corresponding to the two series of light beams that are used for orientation determination emitted by a first base station and a second base station, respectively. In addition, the tracking module 150 separates the two series of data by identifying an offset time period $T_{offset}$.

The system 100 calculates 628 an orientation using at least the identified illumination data. The calculation may be further based on the determined first rotational speed on and the offset angle $\alpha_1$, and the determined second rotational speed $\omega_1'$ and the offset angle $\alpha_1'$. For example, the tracking module 150 applies a first model to the two series of data that occurs every time interval $T_1$ thereby to calculate the orientation with respect to the first base station 135A. The tracking module 150 applies a second model to the two series of data that occurs every time interval $T_1'$ thereby to calculate the orientation with respect to the second base station 135B. Each model observes relationships between illumination data and corresponding orientation of the object. The model is selected based on the base station. The model may be further selected based on the determined first rotational speed $\omega_1$ and the offset angle cu. For example, the model includes a spatial model of detector locations relative to a reference vector (e.g., a known position inside the tracked object). The tracking module 150 warps the model to illumination data to determine an orientation of the object. As another example, a model includes a model of intensity levels to incident angles. The tracking module 150 compares observed different intensity levels to the model to determine actual incident angle of the light beams onto detectors on a surface of the object thereby to determine an orientation of the surface.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
    a first base station configured to emit a first plurality of light beams rotating at a first rotational speed;
    a second base station configured to emit a second plurality of light beams rotating at a second rotational speed different from the first rotational speed; and
    an object including at least one detector configured to:
        detect illumination by the first plurality of light beams and the second plurality of light beams over a period of time, and
        generate illumination data in response to the detected illumination.

2. The system of claim 1, wherein the first base station is further configured to select the first rotational speed.

3. The system of claim 2, wherein the first base station is further configured to:
    detect the second plurality of light beams emitted by the second base station; and
    determine the second rotational speed based on the second plurality of light beams.

4. The system of claim 1, wherein the first base station is further configured to:
    detect the second base station; and
    provide the first rotational speed to the second base station.

5. The system of claim 1, further comprising:
    a console including a processor configured to:

receive the illumination data from the object;
identify a first set of illumination data generated in response to illumination by the first plurality of light beams;
identify a second set of illumination data generated in response to illumination by the second plurality of light beams;
apply a first model to the first set of illumination data to determine a first orientation of the object relative to the first base station; and
apply a second model to the second set of illumination data to determine the second orientation of the object relative to the second base station.

6. The system of claim 5, wherein the console is further configured to:
select the first rotational speed; and
provide the first rotational speed to the first base station.

7. The system of claim 6, wherein the console is further configured to:
receive the second rotational speed from the second base station.

8. The system of claim 6, wherein the console is further configured to:
detect the first base station.

9. The system of claim 6, wherein the console is further configured to:
detect the second plurality of light beams emitted by the second base station; and
determine the second rotational speed based on the second plurality of light beams.

10. A device comprising:
a processor; and
memory storing computer readable instructions configured to cause the processor to:
receive, from an object, illumination data comprising a first set of illumination data generated in response to illumination by a first plurality of light beams emitted by a first base station and a second set of illumination data generated in response to illumination by a second plurality of light beams emitted by a second base station;
identify the first set of illumination data and the second set of illumination data;
apply a first model to the first set of illumination data to determine a first orientation of the object in reference to the first base station; and
apply a second model to the second set of illumination data to determine a second orientation of the object in reference to the second base station,
wherein the first plurality of light beams rotate at a first rotational speed and the second plurality of light beams rotate at a second rotational speed different from the first rotational speed.

11. The device of claim 10, wherein the computer readable instructions are further configured to cause the processor to:
determine a first time interval corresponding to the first rotational speed; and
identify the first set of illumination data based on the first time interval.

12. The device of claim 11, wherein the computer readable instructions are further configured to cause the processor to:
determine a second time interval corresponding to the second rotational speed; and
identify the second set of illumination data based on the second time interval.

13. The device of claim 10, wherein the first plurality of light beams are separated by a first constant angle and wherein the computer readable instructions are further configured to cause the processor to:
determine the first rotational speed; and
determine the first constant angle using the illumination data and the determined first rotational speed.

14. The device of claim 13, wherein the computer readable instructions are further configured to cause the processor to:
select the first model based on the first rotational speed and the first constant angle.

15. The device of claim 10, wherein the computer readable instructions are further configured to cause the processor to:
select the first rotational speed; and
provide the first rotational speed to the first base station.

16. The device of claim 15, wherein the computer readable instructions are further configured to cause the processor to:
receive the second rotational speed from the second base station.

17. The device of claim 10, wherein the object is coupled to at least one detector configured to detect the illumination by the first plurality of light beams and the second plurality of light beams and to generate the illumination data in response to the detected illumination, further comprising the at least one detector.

18. A computer-implemented method, comprising:
receiving, from an object, illumination data comprising a first set of illumination data generated in response to illumination by a first plurality of light beams emitted by a first base station and a second set of illumination data generated in response to illumination by a second plurality of light beams emitted by a second base station;
identifying the first set of illumination data and the second set of illumination data;
applying a first model to the first set of illumination data to determine a first orientation of the object in reference to the first base station; and
applying a second model to the second set of illumination data to determine a second orientation of the object in reference to the second base station,
wherein the first plurality of light beams rotate at a first rotational speed and the second plurality of light beams rotate at a second rotational speed different from the first rotational speed.

19. The computer-implemented method of claim 18, further comprising:
determining a first time interval corresponding to the first rotational speed; and
identifying the first set of illumination data based on the first time interval.

20. The computer-implemented method of claim 18, further comprising:
determining a second time interval corresponding to the second rotational speed; and
identifying the second set of illumination data based on the second time interval.

21. The computer-implemented method of claim 18, wherein the first plurality of light beams are separated by a first constant angle, further comprising:
determining the first rotational speed; and
determining the first constant angle using the illumination data and the determined first rotational speed.

22. The computer-implemented method of claim 18, further comprising:
   selecting the first model based on the first rotational speed and the first constant angle.

23. The computer-implemented method of claim 18, wherein the object is coupled to at least one detector configured to detect the illumination by the first plurality of light beams and the second plurality of light beams and generate the illumination data, further comprising:
   detecting the illumination by the first plurality of light beams and the second plurality of light beams and generating the illumination data.

\* \* \* \* \*